United States Patent
Zhu et al.

(10) Patent No.: US 8,110,031 B2
(45) Date of Patent: Feb. 7, 2012

(54) ETHANOL-BASED INK COMPOSITION

(75) Inventors: Linfang Zhu, Naperville, IL (US); Godwin Deng, Schaumburg, IL (US); Fengfei Xiao, Northbrook, IL (US)

(73) Assignee: Videojet Technologies Inc.

( * ) Notice: Subject to any disclaimer, the term of this patent is extended or adjusted under 35 U.S.C. 154(b) by 302 days.

(21) Appl. No.: 12/402,911

(22) Filed: Mar. 12, 2009

(65) Prior Publication Data

US 2010/0233368 A1    Sep. 16, 2010

(51) Int. Cl.
*C09D 11/02* (2006.01)
*G01D 11/00* (2006.01)

(52) U.S. Cl. ..................... 106/31.58; 347/100
(58) Field of Classification Search ............... 106/31.58; 347/100
See application file for complete search history.

(56) References Cited

U.S. PATENT DOCUMENTS

| | | | |
|---|---|---|---|
| 5,466,287 A | 11/1995 | Lyon | |
| 5,711,791 A | 1/1998 | Croker et al. | |
| 5,744,519 A * | 4/1998 | Heraud et al. | 523/160 |
| 5,935,308 A * | 8/1999 | Siddiqui et al. | 106/31.14 |
| 5,998,502 A | 12/1999 | Burr et al. | |
| 6,010,564 A | 1/2000 | Zhu et al. | |
| 6,251,175 B1 | 6/2001 | Zhu et al. | |
| 6,444,019 B1 * | 9/2002 | Zou et al. | 106/31.4 |
| 6,869,986 B1 | 3/2005 | Millot | |
| 7,081,158 B2 | 7/2006 | Sabys et al. | |
| 7,147,699 B2 | 12/2006 | Moore et al. | |
| 7,758,682 B2 * | 7/2010 | Buhrke | 106/31.35 |
| 2004/0110868 A1 | 6/2004 | Zhu | |
| 2004/0220298 A1 | 11/2004 | Kozee | |
| 2004/0244644 A1 | 12/2004 | Del Moro | |
| 2005/0090579 A1 | 4/2005 | Zhu | |
| 2005/0101694 A1 | 5/2005 | Elmer | |
| 2008/0193725 A1 | 8/2008 | De Saint-Romain | |
| 2009/0246377 A1 * | 10/2009 | Robertson et al. | 427/256 |
| 2010/0028632 A1 | 2/2010 | Goustiaux | |
| 2010/0098860 A1 * | 4/2010 | Robertson et al. | 427/256 |

FOREIGN PATENT DOCUMENTS

| | | |
|---|---|---|
| EP | 0928321 | 4/2004 |
| JP | 2001-152056 | 6/2001 |
| JP | 2004-315717 | 11/2004 |

OTHER PUBLICATIONS

Australian Patent Office, International Search Report for PCT/US2010/026671, Apr. 21, 2010.

* cited by examiner

*Primary Examiner* — Jerry Lorengo
*Assistant Examiner* — Veronica F Faison
(74) *Attorney, Agent, or Firm* — Joseph A. Yosick

(57) ABSTRACT

An ink jet ink composition includes ethanol, a binder, a conductive agent, and a colorant. The ethanol is present in an amount at least 70% by weight of the ink composition. The binder is not a polyamide resin, a hydroxyaromatic resin, or a phenolic resin. The binder is present in an amount between 2% and 15% by weight of the ink composition. Water, if present, is in an amount less than 5% by weight of the ink composition.

20 Claims, No Drawings

ETHANOL-BASED INK COMPOSITION

FIELD OF THE INVENTION

The present invention relates to an ink jet ink composition in general, and to an ethanol-based ink composition in particular.

BACKGROUND OF THE INVENTION

In ink jet printing, printing is accomplished without contact between the printing device and the substrate on which the printed characters are deposited. Briefly described, ink jet printing involves projecting a stream of ink droplets to a surface and controlling the direction of the stream, e.g., electronically, so that the droplets are caused to form the desired printed image on that surface. This technique of noncontact printing is well suited for application of characters onto a variety of surfaces including porous and non-porous surfaces.

In general, an ink jet ink composition should meet certain requirements to be useful in ink jet printing operations. These relate to viscosity, resistivity, solubility, compatibility of components, and wettability of the substrate. Further, the ink should be quick-drying and smear resistant, should be capable of passing through the ink jet nozzle without clogging, and should permit rapid cleanup of the machine components with minimum effort. In addition, the jet ink composition should provide printed images that adhere well to the substrates, particularly non-porous substrates. Those of ordinary skill in the art know of challenges that non-porous substrates pose in achieving image adhesion.

BRIEF SUMMARY OF THE INVENTION

In one aspect, an ink jet ink composition includes ethanol, a binder, a conductive agent, and a colorant. The ethanol is present in an amount at least 70% by weight of the ink composition. The binder is not a polyamide resin, a hydroxyaromatic resin, or a phenolic resin. The binder is present in an amount between 2% and 15% by weight of the ink composition. Water, if present, is in an amount less than 5% by weight of the ink composition.

In another aspect, an ink jet ink composition includes ethanol, at least one binder, and a solvent dye. The ethanol is present in an amount at least 70% by weight of the ink composition. The at least one binder is selected from acrylic resins, polyvinyl butyral resins, ethylcellulose resins, and mixtures thereof. The binder is present in an amount between 2% and 15% by weight of the ink composition. Water, if present, is in an amount less than 5% by weight of the ink composition.

In another aspect, an ink jet ink composition includes ethanol, at least one binder, a conductive agent, and a solvent dye. The ethanol is present in an amount at least 78% by weight of the ink composition. The binder comprises an acrylic resin, and is not a polyamide resin, a hydroxyaromatic resin, or a phenolic resin. Water, if present, is in an amount less than 3% by weight of the ink composition. The conductive agent is present in an amount between 0.2% and 3% by weight of the ink composition. The ink composition is substantially free of methanol.

DETAILED DESCRIPTION OF THE INVENTION

The disclosure provides an ink jet ink composition including ethanol as a solvent, a binder, a conductive agent, and a colorant. The ink composition provides acceptable printing properties, remains stable for extended periods of time, and provides acceptable adhesion properties on a substrate.

MEK and methanol are commonly used solvents for ink jet inks because they offer good solvency for key ink jet components such as binder resin and dyes. In addition, they provide good dry time due to their volatility. However, it has become desirable to develop and market inks based on solvents other than MEK and methanol due to health and safety concerns for MEK and methanol, as well as regulatory concerns such as VOC (volatile organic compounds) and HAP (hazardous air pollutants). Both MEK and methanol are regulated under VOC regulations in the U.S. Methanol is regulated as HAP. In Europe, methanol is listed as a toxic chemical and requires the skull and cross-bone symbol on the label. In addition, methanol is listed on the European Council of Paint, Printing Ink, and Artists' Colours Industry (CEPE) Exclusion List for printing inks and related products.

Besides MEK and methanol, alternative solvents for ink compositions include acetone, methyl acetate, dioxolane, and ethyl acetate. However, acetone and methyl acetate are too volatile for ink jet printing, leading to higher makeup consumption as well as less printer reliability in hot environments. Dioxolane and ethyl acetate are less effective in providing ink conductivity, so more conductive agent is required, which leads to poorer adhesion of the ink composition to substrates. Further, all these solvents still suffer from health/safety/odor concerns, particularly when printing on certain food packaging materials.

It has been found that ethanol is a much more acceptable solvent for ink jet ink compositions because it has low odor and has relatively low toxicity. It is not regulated under HAP and is not included on the CEPE Exclusion List. However, ethanol does not have very good solvency for many of the resins, dyes, and conductive agents commonly used in MEK ink jet inks, so it is more challenging to meet ink adhesion and ink stability requirements, due to limited choices with binder resins, dyes, conductive agents, and limited compatibility between dyes and conductive agents. In addition, ethanol inks tend to absorb water, especially in humid environments, so water tolerance of the ink is very important for reliable printer operation. The choice of suitable resins for ethanol-based ink compositions is also a challenge. Phenolic resins are not considered very safe due to the presence of residual phenol and trace amount of formaldehyde in ink compositions using phenolic binders. Polyamide resins have a tendency to precipitate out of solution when the ink absorbs water from the environment, which also leads to unreliable printer operation, especially in humid environments.

Thus, the present ink composition uses ethanol as a solvent. The ethanol may be provided in any suitable form. In one embodiment, the ethanol is provided as SDA 3C, which is an anhydrous ethanol with isopropyl alcohol (IPA) as a denaturant. SDA 3C is available from Ashland Chemical Company, Equistar Chemicals L.P., and Eastman Chemical Company. Preferably the denaturants in ethanol contains no chemicals on the CEPE list such as methanol. Other chemicals on the CEPE list include 2-methoxyethanol, 2-ethoxyethanol, 2-methoxyethyl acetate, 2-ethoxyethyl acetate, monochlorobenzene, dichlorobenzene, volatile chlorinated hydrocarbons, volatile fluorochlorinated hydrocarbons, and 2-nitropropane. More preferably the denaturants do not contain methyl ethyl ketone and other ketones in addition to the chemicals on the CEPE list. Even more preferably the denaturants do not contain esters and ketones and chemicals on the CEPE list. The ethanol may be present in any suitable amount, for example, in an amount 70% or more, about 75% or more, about 78% or more about 80% or more, about 81% or more, or about 82% or more by weight of the ink jet ink composition. In an embodiment, ethanol may be present in an amount from 70% to about 95%, preferably from about 75% to about 90%, more preferably from about 80% to about 85%, and most preferably from about 81% to about 84% of the ink jet ink composition.

The ink composition preferably includes little or no water. Water is preferably present in an amount less than 5%, more preferably less than 4%, even more preferably less than 2%, and most preferably less than 1% by weight of the ink jet ink composition. The ink composition is preferably substantially free of any other organic solvents besides the denaturants used in ethanol. In particular, if the composition includes methanol, it is preferably present in an amount less than 1%, less than 0.5%, or less than 0.1% by weight of the ink composition. Most preferably, the ink composition is substantially free of methanol. Further, if the composition includes ethyl acetate, it is preferably present in an amount less than 5%, less than 2%, or less than 1% by weight of the ink composition. More preferably, the ink composition is substantially free from ethyl acetate.

The ink composition includes at least one binder resin. One or more binder resins may be present. Any suitable binder resin, soluble or dispersible, may be employed, preferably an ethanol-soluble binder resin. In an embodiment, the ink composition includes one or more binder resins selected from acrylic resins, polyvinyl butyral resins, ethylcellulose resins, polyurethane resins, modified rosin resins, phenolic resins, polyamides, cellulose ethers, cellulose nitrate resins, polymaleic anhydrides, acetal polymers, styrene/methacrylate copolymers, aldehyde resins, polyvinyl alcohol, copolymers of styrene and allyl alcohol, and polyketone resins, and any combination thereof. Acrylic resin includes both polymers of the acrylics and/or alkyl acrylics and polymers of the acrylics and/or alkyl acrylics with other monomers such as styrene and/or alpha-methylstyrene. The composition preferably includes one or more binder resins selected from acrylic resins, polyvinyl butyral resins, ethylcellulose resins, and any combination thereof. In one embodiment, the ink composition includes an acrylic resin as the primary binder and either a polyvinyl butyral resins, a ethylcellulose resins, or a mixture thereof as a secondary binder.

Examples of acrylic resins include styrene-acrylic resins which can be made by copolymerizing styrene with acrylic monomers such as acrylic acid, or methacrylic, and optionally with alkyl acrylate monomers such as methyl acrylate, methyl methacrylate, butyl acrylate, butyl methacrylate, hydroxyethyl acrylate, hydroxyethyl methacrylate, and the like S.C. Johnson & Co., in Racine, Wis. sells styrene acrylics under the tradename JONCRYL™. Examples of JONCRYL™ resins include JONCRYL™ 555, 586, 678, 680, 682, 683, and 67. JONCRYL 682, a preferred resin, has a weight average molecular weight of about 1700, an acid number of about 238, a softening temperature of about 105° C., and a glass transition temperature of about 56° C. Examples of polyvinyl butyral resins are PIOLOFORM™ BN18, available from Wacker Chemie AG, and MOWITAL™ B20H available from Kuraray America, Inc. Examples of ethylcellulose resins are Ethocell available from Dow Chemical.

In one embodiment, the ink composition does not include phenolic resin as a binder. An advantage of the jet ink composition is that the binder resin may be free or substantially free of aldehydes, such as formaldehyde, which are the undesirable residues frequently found in aldehyde derived phenolic resins such as novolaks and resoles. Formaldehyde is toxic and a suspected carcinogen. It is believed that the aldehyde residues which are often found in the resin adversely affects the color characteristics of certain dyes, e.g., azo dyes. The ink composition preferably includes less than 1% or less than 0.5% of any phenolic resin, by weight of the ink composition. The ink composition is preferably substantially free of phenolic resins.

In another embodiment, the ink composition does not include a polyamide resin as a binder. Polyamide resins have tendency to precipitate out when the ink composition absorbs water from the environment. The ink composition preferably includes less than 1% or less than 0.5% of any polyamide resin, by weight of the ink composition. The ink composition is preferably substantially free of polamide resins.

In another embodiment, the ink composition does not include a hydroxyaromatic resin as a binder. The ink composition preferably includes less than 1% or less than 0.5% of any hydroxyaromatic resin, by weight of the ink composition. The ink composition is preferably substantially free of hydroxyaromatic resins.

The binder resin may be present in any suitable amount, for example, in an amount from about 0.1% to about 30%, preferably from about 0.2% to about 15%, and more preferably from about 5% to about 12% of the ink jet ink composition.

The ink jet ink composition preferably has a low resistivity, such as within the range of about 20 to about 2000 ohm-cm. The desired conductivity can be achieved by the addition of an ionizable material or conductive agent. Examples of such conductive agents include ammonium, alkali, and alkaline earth metal salts such as ammonium hydroxide, lithium nitrate, lithium chloride, lithium thiocyanate, lithium trifluoromethanesulfonate, sodium chloride, potassium chloride, potassium bromide, calcium chloride, and the like, dimethylamine hydrochloride, and hydroxylamine hydrochloride, as well as ammonium acetate. Preferred conductive agents include ammonium acetate and diethylamine hydrochloride. Any suitable amount of the conductive agents can be used. Normally, a conductive agent content of up to about 3% by weight of the ink composition provides the desired conductivity, typically in a range of about 0.5% to about 2%. In certain applications, high conductivity is not necessary, and the conductive agent may be omitted.

The ink composition of the invention may include any suitable colorant or colorants, which is preferably a dye. In an embodiment of the invention, one or more dyes are employed as the colorant, wherein the one or more dyes are selected from the group consisting of acid dyes, basic dyes, solvent dyes, disperse dyes, mordant dyes and any combination thereof. Examples of solvent dyes include naphthol dyes, azo dyes, metal complex dyes, anthraquinone dyes, quinoimine dyes, indigoid dyes, benzoquinone dyes, carbonium dyes, naphthoquinone dyes, naphthalimide dyes, phthalocyanine dyes, and perylene dyes. One or more colorants may be present.

For example, the ink composition may include one or more dyes are selected from the group consisting of C.I. Solvent Black 3, C.I. Solvent Black 5, C.I. Solvent Black 7, C.I. Solvent Black 22, Solvent Black 26, C.I. Solvent Black 27 (such as VALIFAST BLACK 3840L), C.I. Solvent Black 29 (such as VALIFAST BLACK 3808 and ORASOL BLACK RLI™), C.I. Acid Black 123, C.I. Solvent Black 48, any combination thereof. Preferred solvent dyes are Solvent Black 27 (VALIFAST BLACK 3840L), Solvent Black 29 (ORASOL BLACK RLI™), and Solvent Black 29 (VALIFAST BLACK 3808).

In any of the embodiments above, the colorant may be present in an amount from about 0.1% to about 12%, preferably from about 1% to about 10%, and more preferably from about 2% to about 8% by weight of the ink jet ink composition.

In a particular embodiment of the ink composition, ethanol may be present in an amount at least about 75% by weight, the colorant(s), may be present in amount from about 2% to about 8% by weight, the conductive agent may be present in an amount from about 0.5% to 2% by weight, and the binder resin may be present in an amount from about 2% to about 15% by weight of the ink jet ink composition.

The ink composition of the invention may further include one or more additives such as plasticizers, surfactants, aliphatic hydrocarbons, adhesion promoters, and mixtures thereof. The additive preferably does not phase separate from the ink jet composition during application of the ink to a substrate during printing. Examples of surfactants include siloxanes, silicones, silanols, polyoxyalkyleneamines, propoxylated (poly(oxypropylene)) diamines, alkyl ether amines, nonyl phenol ethoxylates, ethoxylated fatty amines, quaternized copolymers of vinylpyrrolidone and dimethyl aminoethyl methacrylate, fluorinated organic acid diethanolamine salts, alkoxylated ethylenediamines, polyethylene oxides, polyoxyalkylene polyalkylene polyamines amines, polyoxyalkylene polyalkylene polyimines, alkyl phosphate ethoxylate mixtures, polyoxyalkylene derivatives of propylene glycol, and polyoxyethylated fatty alcohols. A specific example of a suitable polymeric surfactant, is Silwet L-7622, available from GE, which is a silicone surfactant.

In any of the embodiments, the surfactant additive may be present in an amount from about 0.01 to about 1.0% by weight, preferably from about 0.02 to about 0.5% by weight of the ink jet ink composition.

The ink composition may also include an adhesion promoter. A suitable adhesion promoter is a silane, such as SILQUEST® WETLINK 78, which is glycidoxypropyl diethoxymethylsilane, SILQUEST A-186 SILANE, which is beta-(3,4-epoxycyclohexyl)ethyltrimethoxy silane, and SILQUEST A-187 SILANE, which is gamma-glycidoxypropyltrimethoxy silane, all available from GE. The adhesion promoter may be present in an amount from about 0.1 to about 2% by weight, preferably from about 0.2 to about 1.0%, and more preferably from about 0.5% of the ink composition.

The ink composition of the invention has one or more attractive features such as short unassisted dry times of printed alphanumeric or graphic images, good adhesion to semi-porous and non-porous substrates, and safety or material compatibility with one or more components of an ink jet printer. For example, embodiments of the ink jet ink composition of the invention have a dry time of about 10 seconds or less, such as 5 seconds or less, 4 seconds or less, or 2 seconds or less, under ambient conditions.

The ink composition of the invention may have any suitable viscosity or surface tension. In embodiments of the invention, the ink composition has a viscosity in the range of 1 cP to 10 cP, preferably in the range of 3 cP to 5 cP at 25° C. The ink composition preferably has a viscosity of less than about 10 cPs, preferably less than about 5 cPs at 25° C.

In embodiments of the invention, the jet ink composition has a surface tension from about 20 to about 30 mN/m at 25° C.

The ink composition of the invention may be prepared by any suitable method. For example, the chosen ingredients may be combined and mixed with adequate stirring and the resulting fluid filtered to remove any undissolved impurities.

The present invention further provides a method for printing images on a substrate in a continuous ink jet printer comprising directing a stream of droplets of any of the embodiments of the ink composition of the invention to a substrate and allowing the ink droplets to dry, thereby printing images on a substrate. Any suitable substrate may be printed in accordance with the invention. Examples of suitable substrates include porous substrates such as uncoated paper, semi-porous substrates such as aqueous coated paper, clay coated paper, silica coated paper, UV overcoated paper, polymer overcoated paper, and varnish overcoated paper, and non-porous substrates such as hard plastics, polymer films, metals, glass, and ceramics. The paper substrates may be thin sheets of paper, rolls of paper, or cardboard. Plastics, metals, glass, and ceramic substrates may be in any suitable form such as in the form of bottles or containers, plates, rods, cylinders, etc.

The ink jet ink composition is preferably stable over a period of several weeks at temperature extremes, such as between −15° C. and 62° C. Additionally, the ink jet ink composition preferably is able to remain stable even after absorbing water from the environment. In particular, the ink composition can preferably absorb up to 3%, 5%, or 7% water by weight of the ink composition and still maintain its stability. Further, the ink composition preferably has acceptable adhesion properties after being transferred to a substrate.

EXAMPLES

The following examples further illustrate the invention but, of course, should not be construed as in any way limiting its scope. The following Examples illustrate the preparation of an ink composition suitable for use in a continuous ink jet printer. In each case, the ingredients were combined and mixed until all solid components were dissolved. The resulting mixture was filtered to remove any particulates and the ink composition was recovered. The ink composition was printed using a representative continuous ink jet printer on a variety of non-porous substrates including glass, aluminum, polyethylene, polypropylene, and polyvinyl chloride.

These examples illustrate various embodiments of ink composition of the invention. Examples 1-3 were inventive samples. Comparative Example 1 was a commercially available ink, the composition of which was determined through chemical testing. The materials employed in preparing the ink jet ink composition, their amounts, and the formulation numbers are set forth in Table 1 below.

TABLE 1

| Components, % | Example 1 | Example 2 | Example 3 | Comparative Example 1 |
| --- | --- | --- | --- | --- |
| ethanol (SDA 3C) | 81.16 | 81.65 | 82.05 | 76.9 |
| Water | | | | 5.5 |
| acrylic binder (Joncryl 682) | 9.14 | 9.40 | 9.2 | |
| polyvinyl butyral (Pioloform BN) | 1.73 | | 2.1 | |
| ethyl cellulose (Ethocel STD 4) | | 1.00 | | |
| Phenolic Resin | | | | 10.9 |
| Ammonium Acetate | 1.92 | 1.90 | | 1.1 |
| Dimethylamine Hydrochloride | | | 0.6 | |
| Solvent Black 27 (Valifast Black 3840L) | 5.5 | 5.5 | | |
| Solvent Black 29 (Orasol Black RLI) | | | 5.5 | |
| Solvent Black 29 (Valifast Black 3808) | | | | 5.6 |
| silane adhesion promoter (Wetlink 78) | 0.5 | 0.5 | 0.5 | |
| silicon surfactant (Silwet L-7622) | 0.05 | 0.05 | 0.05 | |
| Total | 100.00 | 100.00 | 100.00 | 100.00 |

The above Examples were tested for ink stability. The ink stability data was determined by testing the compositions by filtration with a one micron membrane. The ink passes the filtration test if the filtration time is less than 5 minutes when about 100 milliliters of ink is filtered through a 13 millimeter diameter membrane and there is no visible solid material left on the membrane at the end of the filtration test. For each Example, up to four tests were performed: 1) an initial 1 micron filtration test; 2) 2 or 4 weeks of accelerated aging at 62° C. followed by a 1 micron filtration test; 3) a water tolerance test comprising slowly adding water to the ink composition under mixing, storing the mixture at 62° C. for one week, followed by a 1 micron filtration test; and 4) printer testing, comprising printing the ink composition at lab ambient conditions for about one week, removing an ink sample from the ink mixing tank, and testing for 1 micron filtration. The results are shown in Table 2 below.

TABLE 2

| Test stage | Example 1 | Example 2 | Example 3 | Comparative Example 1 |
|---|---|---|---|---|
| Initial 1 micron filtration test | Pass | Pass | Pass | Pass |
| Accelerated aging test | Pass | Pass[1] | not tested | Pass |
| Water tolerance test | Pass[2] | not tested | not tested | Fail[3] |
| Printer testing | Pass | not tested | not tested | not tested |

[1]Example 2 was tested up to 2 weeks.
[2]Example 1 passed the water tolerance at up to 7% water addition.
[3]Comparative Example 1 failed at 3% water addition.

The ink composition of Example 1 passed all four tests, thus showing exceptional stability. The ink compositions of Examples 2 and 3 passed the stability tests performed on them. The ink composition of Comparative Example 1 failed the water tolerance test at 3% addition, thus indicating that composition is not suitable for use in humid environments. While not intending to be bound by theory, it is believed that the water already in the ink, the dye, the conductive agent, or the combination thereof presented stability problems for Comparative Example 1.

The ink compositions were also tested for rub adhesion on various substrates, scratch adhesion on various substrates, and adhesive tape adhesion for various substrates. The ink compositions were applied to the substrate using a continuous ink jet printer. Substrates included various plastics (such as LDPE, PP, PVC, and PET), glass, and aluminum. The ink compositions of Examples 1 to 3 exhibited generally acceptable properties which were comparable to an existing MEK-based general purpose ink. The ink compositions of Examples 1 and 2 had average dry times of about 2.5 seconds.

From the Examples above, it can be seen the ink jet ink composition is stable over a period of several weeks. Additionally, the ink jet ink composition is able to remain stable even after absorbing water from the environment. Further, the ink composition preferably has acceptable adhesion properties on a variety of substrates.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein may be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An ink jet ink composition comprising:
    ethanol, wherein the ethanol is present in an amount at least 70% by weight of the ink composition;
    a binder present in an amount between 2% and 15% by weight of the ink composition, where the binder comprises a polyvinyl butyral resin and does not include a polyamide resin, a hydroxyaromatic resin, or a phenolic resin;
    water in an amount less than 5% by weight of the ink composition;
    a conductive agent; and
    a dye.

2. The ink composition of claim 1, wherein the dye is selected from the group consisting of acid dyes, basic dyes, solvent dyes, direct dyes, disperse dyes, mordant dyes, reactive dyes, and mixtures thereof.

3. The ink composition of claim 1, wherein the dye is a solvent dye.

4. The ink composition of claim 3, where the dye is selected from Solvent Black 27 and Solvent Black 29.

5. The ink composition of claim 1, wherein the ink composition is substantially free of methanol.

6. The ink composition of claim 1, wherein the ink composition comprises less than 5% ethyl acetate by weight of the ink composition.

7. The ink composition of claim 1, wherein the binder comprises an acrylic resin.

8. The ink composition of claim 1, wherein the conductive agent comprises ammonium acetate.

9. An ink jet ink composition comprising:
    ethanol, wherein the ethanol is present in an amount at least 70% by weight of the ink composition;
    at least one binder, where the at least one binder is present in an amount between 2% and 15% by weight of the ink composition and comprises a polyvinyl butyral resin;
    water in an amount less than 5% by weight of the ink composition; and
    a solvent dye.

10. The ink composition of claim 9, wherein the ink composition is substantially free of phenolic resin.

11. The ink composition of claim 9, wherein the ink composition is substantially free of methanol.

12. The ink composition of claim 9, wherein the ink composition is substantially free of hydroxyaromatic resin.

13. The ink composition of claim 9, wherein the ink composition comprises less than 1% polyamide binder.

14. The ink composition of claim 9, wherein the ink composition comprises less than 5% ethyl acetate.

15. The ink composition of claim 9, wherein the ink composition comprises ammonium acetate as a conductive agent.

16. An ink jet ink composition comprising:

ethanol, wherein the ethanol is present in an amount at least 78% by weight of the ink composition;

at least one binder, where the binder comprises a polyvinyl butyral resin, and where the binder is not a polyamide resin or a phenolic resin;

water in an amount less than 3% by weight of the ink composition;

a conductive agent, wherein the conductive agent is present in an amount between 0.2% and 3% by weight of the ink composition; and a solvent dye, wherein the ink composition is substantially free of methanol.

17. The ink composition of claim 16, wherein the at least one binder further comprises an ethyl cellulose resin.

18. The ink composition of claim 16, wherein the conductive agent is ammonium acetate.

19. A method for printing images on a substrate with a continuous ink jet printer comprising:

directing a stream of droplets of the ink jet ink composition of claim 1 to a substrate; and allowing the ink droplets to dry, thereby printing an image on the substrate.

20. The ink composition of claim 9, wherein the at least one binder further comprises an ethyl cellulose resin.

* * * * *